US012676553B2

(12) United States Patent
Lin et al.

(10) Patent No.: US 12,676,553 B2
(45) Date of Patent: Jul. 7, 2026

(54) CONVERSION CONTROL CIRCUIT FOR CONTROLLING A STACKABLE MULTI-PHASE POWER CONVERTER

(71) Applicant: Richtek Technology Corporation, Hsinchu (TW)

(72) Inventors: Chen-Yun Lin, Hsinchu (TW); Wei-Chuan Wu, Hsinchu (TW); Chih-Hao Yang, Hsinchu (TW); Li-Wen Fang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 154 days.

(21) Appl. No.: 18/909,912

(22) Filed: Oct. 8, 2024

(65) Prior Publication Data

US 2026/0012097 A1 Jan. 8, 2026

(30) Foreign Application Priority Data

Jul. 4, 2024 (TW) ................................. 113125045

(51) Int. Cl.
*H02M 3/158* (2006.01)
*H02M 7/493* (2007.01)
(52) U.S. Cl.
CPC ....... *H02M 3/1584* (2013.01); *H02M 3/1586* (2021.05); *H02M 7/493* (2013.01)
(58) Field of Classification Search
CPC ..... H02M 3/1584; H02M 3/1586; H02M 1/32
See application file for complete search history.

(56) References Cited

U.S. PATENT DOCUMENTS

| | | | | |
|---|---|---|---|---|
| 7,368,959 B1 * | 5/2008 | Xu | ...................... | H02M 3/1584 |
| | | | | 327/540 |
| 9,912,240 B1 * | 3/2018 | Nguyen | .................. | H02M 1/36 |
| 11,770,074 B2 * | 9/2023 | Chen | .................... | H02M 1/088 |
| | | | | 323/272 |
| 2004/0041543 A1 * | 3/2004 | Brooks | ............... | H02M 3/1584 |
| | | | | 323/212 |
| 2004/0208029 A1 * | 10/2004 | Caruthers | ............... | H02J 1/102 |
| | | | | 363/72 |
| 2011/0025284 A1 * | 2/2011 | Xu | ...................... | H02M 3/1584 |
| | | | | 327/294 |

(Continued)

*Primary Examiner* — Yusef A Ahmed
(74) *Attorney, Agent, or Firm* — Huan-Yi Lin

(57) ABSTRACT

A conversion control circuit for controlling a stackable multi-phase power converter, the conversion control circuit including: a master transfer terminal, wherein a master transfer trigger signal is coupled to plural master transfer terminals of plural parallel-connected conversion control circuits; and a master transfer circuit configured to generate or receive the master transfer trigger signal through the master transfer terminal, wherein the master transfer trigger signal is generated according to an output voltage or an output current of the output power, or a pulse-width modulation related signal; when the master transfer trigger signal switches to an enabled state, the conversion control circuits perform a phase sequence swapping procedure, which includes: the master transfer circuit triggering a transfer of a master role from the stackable sub-converter originally acting as the master circuit to another stackable sub-converter of the stackable sub-converters.

15 Claims, 12 Drawing Sheets

(56)             References Cited

U.S. PATENT DOCUMENTS

| | | | |
|---|---|---|---|
| 2015/0188406 A1* | 7/2015 | Nishi | H02M 3/156 |
| | | | 323/217 |
| 2021/0028683 A1* | 1/2021 | Jiang | H02M 1/084 |
| 2021/0028686 A1* | 1/2021 | Jiang | H02M 3/1584 |
| 2021/0028704 A1* | 1/2021 | Jiang | H02M 3/1584 |
| 2021/0288578 A1* | 9/2021 | Luo | H02M 1/088 |
| 2021/0288579 A1* | 9/2021 | Luo | H02M 1/0845 |
| 2021/0288580 A1* | 9/2021 | Luo | H02M 3/1584 |
| 2022/0038008 A1* | 2/2022 | Wu | H02M 1/088 |
| 2022/0271668 A1* | 8/2022 | Hsiao | H02M 1/08 |
| 2023/0110617 A1* | 4/2023 | Yang | H02M 3/157 |
| | | | 323/266 |
| 2023/0238875 A1* | 7/2023 | Yang | H02M 3/1586 |
| | | | 363/13 |
| 2024/0055986 A1* | 2/2024 | Banappagol | H02M 3/1586 |
| 2024/0063720 A1* | 2/2024 | Yang | H02M 1/088 |
| 2025/0079984 A1* | 3/2025 | Wu | H02M 3/1584 |
| 2025/0385597 A1* | 12/2025 | Lin | H02M 1/32 |

* cited by examiner

14

14

14

CONVERSION CONTROL CIRCUIT FOR CONTROLLING A STACKABLE MULTI-PHASE POWER CONVERTER

CROSS REFERENCE

The present invention claims priority to the TW patent application Ser. No. 113125045, filed on Jul. 4, 2024.

BACKGROUND OF THE PRESENT INVENTION

Field of Invention

The present invention relates to a conversion control circuit for controlling stackable multi-phase power converters, and particularly to a conversion control circuit for controlling stackable multi-phase power converters designed to balance switching stress.

Description of Related Art

FIG. 1A shows a circuit schematic diagram of a stackable multi-phase power converter controlled by a conventional conversion control circuit. FIG. 1B shows signal waveform diagrams of related signals of the conversion control circuit and the stackable multi-phase power converter of FIG. 1A. In this conventional stackable multi-phase power converter, a master converter operates with a fixed phase. When load changes cause the number of phases to increase or decrease, the master converter has to handle more current (absolute value, as shown in the circled area in the lower part of FIG. 1B), which significantly reduces the lifetime of the master converter compared to the other phase converters.

In view of this, the present invention proposes a conversion control circuit for controlling stackable multi-phase power converters to balance switching stress.

SUMMARY OF THE PRESENT INVENTION

In one aspect, the present invention provides a conversion control circuit for controlling a stackable multi-phase power converter, wherein the stackable multi-phase power converter includes plural stackable sub-converters. Each of the plural stackable sub-converters includes a power stage circuit and the corresponding conversion control circuit. The plural power stage circuits corresponding to the plural stackable sub-converters are coupled in parallel to generate output power to a load. The conversion control circuit is configured to control at least one switch of the power stage circuit to switch a corresponding inductor, thereby generating the output power. The conversion control circuit comprises: a master transfer terminal, wherein a master transfer trigger signal is coupled to a plurality of the master transfer terminals, which are coupled in parallel, of the plural conversion control circuits; and a master transfer circuit configured to generate or receive the master transfer trigger signal through the master transfer terminal, wherein the master transfer trigger signal is generated based on an output voltage or an output current of the output power or a pulse-width modulation related signal. The conversion control circuit is configured as a master circuit or a slave circuit. When the master transfer trigger signal switches to an enabled state, the conversion control circuit executes a phase sequence swapping procedure. The phase sequence swapping procedure includes: the master transfer circuit triggering a transfer of a master role from the stackable sub-converter originally acting as the master circuit to another stackable sub-converter of the plural stackable sub-converters.

In one preferred embodiment, the phase sequence swapping procedure further includes the master transfer circuit triggering the transfer of a slave phase sequence of the stackable sub-converter originally acting as the slave circuit to another of the stackable sub-converters, other than the one with the master role newly transferred.

In one preferred embodiment, when the stackable multi-phase power converter experiences a state change, a predetermined time has passed, a cumulative number of state changes exceeds a threshold value, or an external command is received, the master transfer circuit switches the master transfer trigger signal to the enabled state.

In one preferred embodiment, the state change includes load state changes, voltage changes, current changes, phase count changes, and/or frequency changes of the pulse-width modulation related signal.

In one preferred embodiment, the load state changes include changing from a heavy load state to a light load state or from the light load state to the heavy load state. The voltage changes include a change of the output voltage or a change of a target of the output voltage. The phase count changes include changes in a number of activated phases. The frequency changes of the pulse-width modulation related signal include changing from high frequency to low frequency or from low frequency to high frequency. The current changes include a total current of the output power exceeding a predetermined threshold.

In one preferred embodiment, the state change is detected by the master circuit.

In one preferred embodiment, the conversion control circuit further comprises a counter configured to accumulate the cumulative number of the state changes.

In one preferred embodiment, the master transfer circuit determines the predetermined time based on counting with a fixed-frequency clock.

In one preferred embodiment, the master transfer circuit determines the predetermined time based on counting the pulse-width modulation related signal, wherein the pulse-width modulation related signal is configured to control the at least one switch of the power stage circuit.

In one preferred embodiment, the phase sequence swapping procedure is performed in either a random sequence or in a predetermined sequence, transferring the master role of the stackable sub-converter originally acting as the master circuit to another stackable sub-converter.

In another aspect, the present invention provides a conversion control circuit further including: a modulation trigger terminal, wherein a modulation trigger signal is coupled to the plural modulation trigger terminals, which are coupled in parallel, of the plural conversion control circuits; and wherein the modulation trigger signal includes plural pulses during a switching cycle period, wherein the plural pulses include a first pulse, wherein the first pulse, which is triggered periodically based on the switching cycle period, is configured to be accumulatively counted as a counting number. When the counting number corresponds to a phase sequence number of the conversion control circuit, the conversion control circuit enables the power stage circuit to generate the output power.

In one preferred embodiment, the modulation trigger signal includes plural pulses with an electrical characteristic different from that of the first pulse, wherein the second pulse is configured as the master transfer trigger signal. The modulation trigger terminal and the master transfer terminal are the same terminal.

In one preferred embodiment, the plural pulses further include a third pulse, the third pulse being configured as a counting reset signal to reset and initiate a counting of the counting number.

In one preferred embodiment, the electrical characteristic of the pulses includes voltage level or pulse width.

In one preferred embodiment, the master transfer trigger signal is generated by the master circuit or by an external device.

The advantages of the present invention are that the present invention can achieve the effect of balancing switching stress to each sub-converter, mitigating potential phase imbalance and long-term reliability issues.

This document has detailed the present invention through specific embodiments. However, these descriptions are intended to facilitate of understanding the present invention's objectives, technical contents, features, and achieved effects, rather than to limit the scope of the present invention. Various combinations and equivalent variations, under the spirit of the present invention, can be conceived by those skilled in the art without departing from the scope and spirit of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
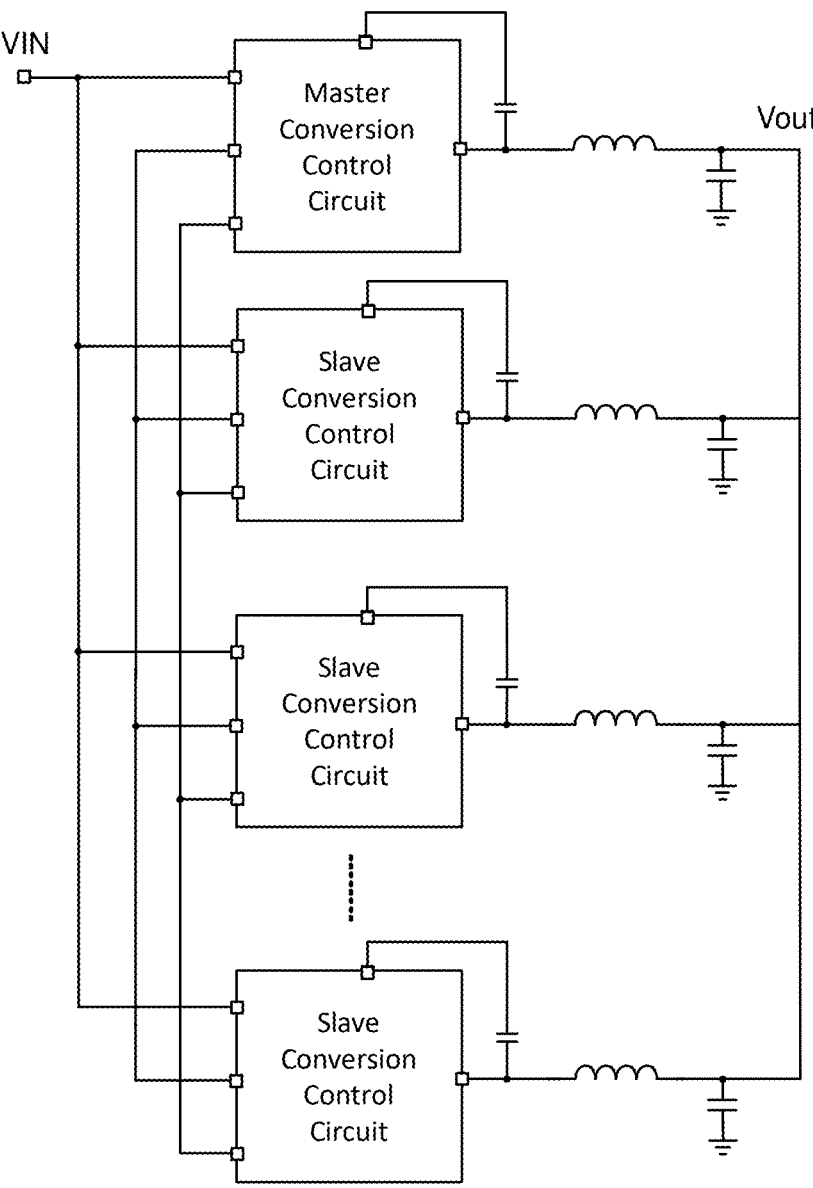
FIG. 1A shows a circuit schematic diagram of a conventional stackable multi-phase power converter and conversion control circuit thereof.
Figure 1B:
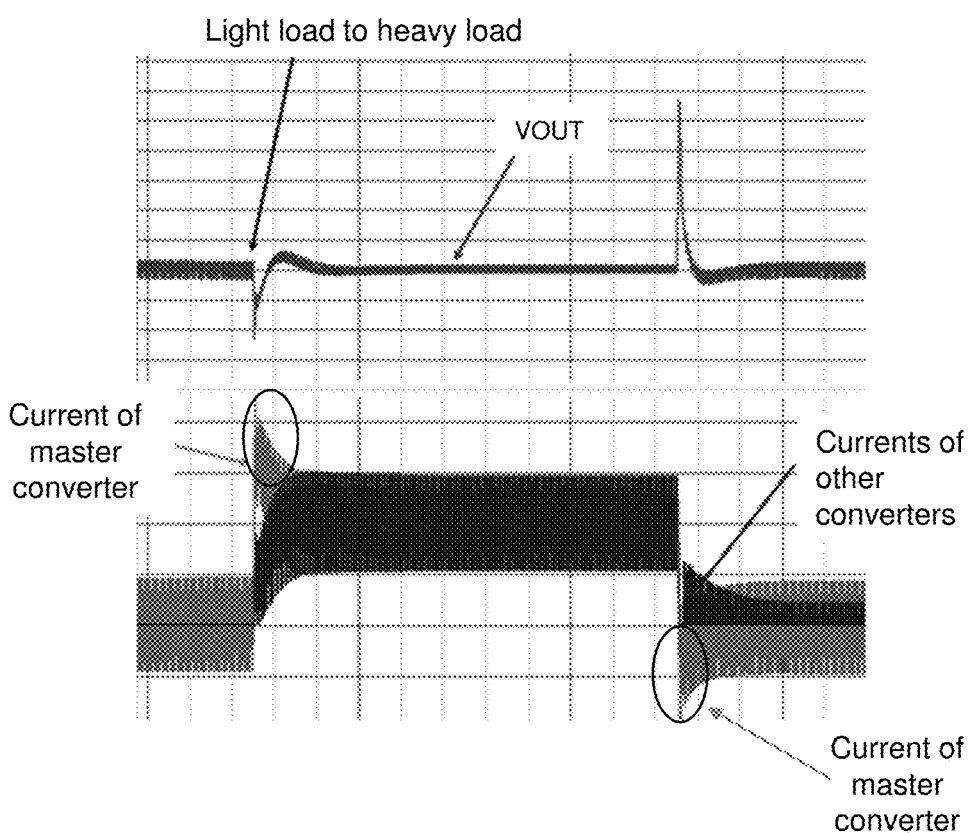
FIG. 1B shows signal waveform diagrams of related signals of the stackable multi-phase power converter and conversion control circuit thereof of FIG. 1A.
Figure 2A:
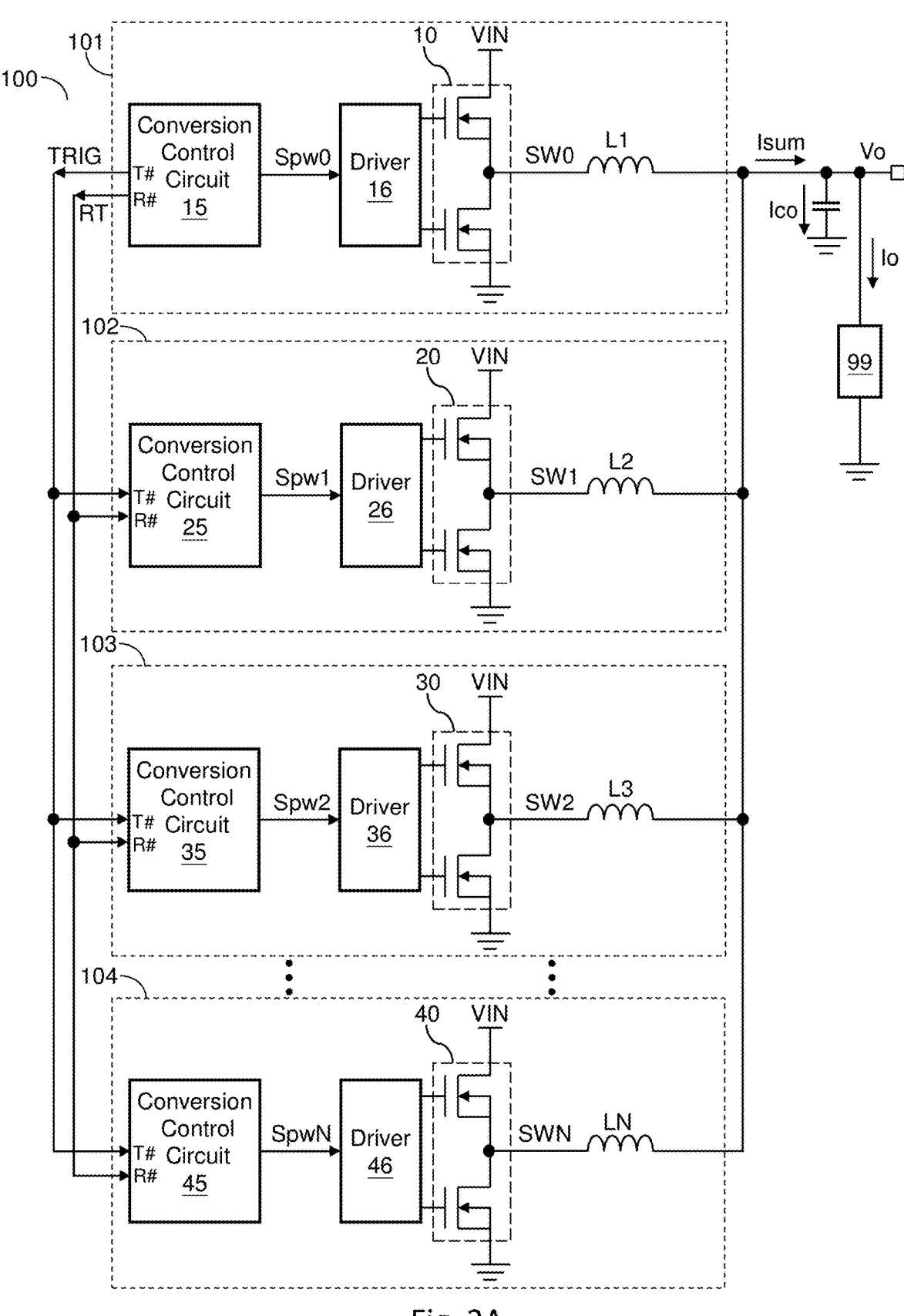
FIG. 2A shows a circuit schematic diagram of a stackable multi-phase power converter and conversion control circuit thereof according to one embodiment of the present invention.

FIG. 2A shows a circuit schematic diagram of a stackable multi-phase power converter and conversion control circuit thereof according to one embodiment of the present invention. As shown in FIG. 2A, the conversion control circuits 15, 25, 35, and 45 of the present invention are configured to control a stackable multi-phase power converter 100. The stackable multi-phase power converter 100 includes plural stackable sub-converters 101, 102, 103, and 104. Each of the stackable sub-converters 101, 102, 103, and 104 respectively includes corresponding power stage circuits 10, 20, 30, and 40, and corresponding conversion control circuits 15, 25, 35, and 45. The power stage circuits 10, 20, 30, and 40 of the stackable sub-converters 101, 102, 103, and 104 are connected in parallel to generate output power for a load 99. The conversion control circuits 15, 25, 35, and 45 are configured to generate pulse-width modulation signals Spw0~SpwN to control at least one switch of the corresponding power stage circuits 10, 20, 30, and 40, thereby switching the corresponding inductors L1, L2, L3 . . . LN to generate output power. The conversion control circuits 15, 25, 35, and 45 include a master transfer terminal R # and a modulation trigger terminal T #.

The master transfer trigger signal RT is coupled to the master transfer terminals R # of the conversion control circuits 15, 25, 35, and 45, wherein the master transfer terminals R # of the conversion control circuits 15, 25, 35, and 45 are jointly connected in parallel. The modulation trigger signal TRIG is coupled to the modulation trigger terminals T # of the conversion control circuits 15, 25, 35, and 45, wherein the modulation trigger terminals T # of the conversion control circuits 15, 25, 35, and 45 are jointly connected in parallel. In one embodiment, the conversion control circuits 15, 25, 35, and 45 can be configured as a master circuit or a slave circuit. When the master transfer trigger signal RT is switched to the enabled state, the conversion control circuits 15, 25, 35, and 45 execute a phase sequence swapping procedure. In one embodiment, the master transfer trigger signal RT is generated by the master circuit.

Figure 2B:
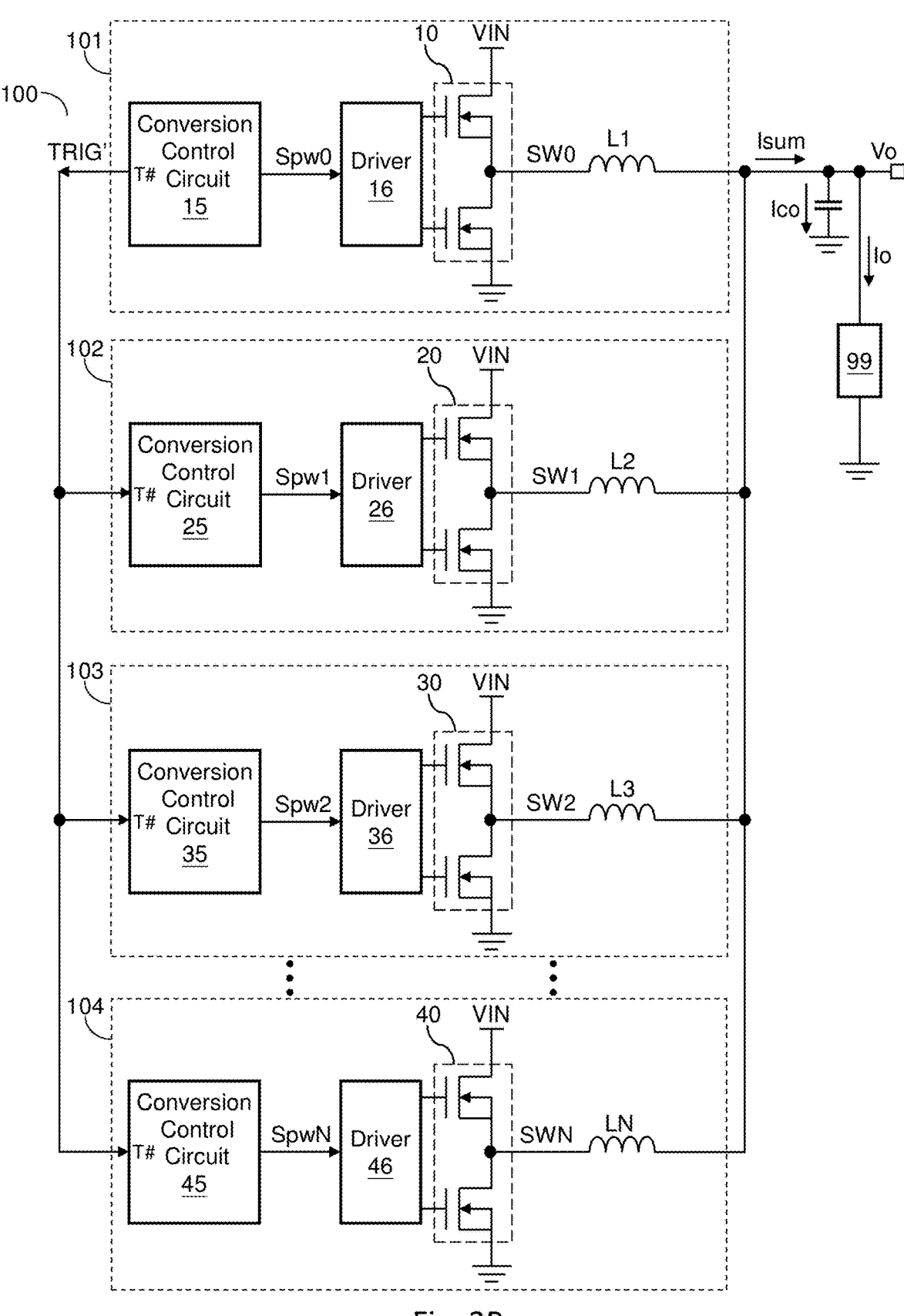
FIG. 2B shows a circuit schematic diagram of a stackable multi-phase power converter and conversion control circuit thereof according to another embodiment of the present invention.

FIG. 2B shows a circuit schematic diagram of a stackable multi-phase power converter and conversion control circuit thereof according to another embodiment of the present invention. This embodiment is similar to the embodiment in FIG. 2A, with the difference being that in this embodiment, the modulation trigger terminal T # and the master transfer terminal are combined into a single terminal. In other words, the master transfer trigger signal RT and the modulation trigger signal TRIG are both transmitted and received via the modulation trigger terminal T #.

Figure 3A:
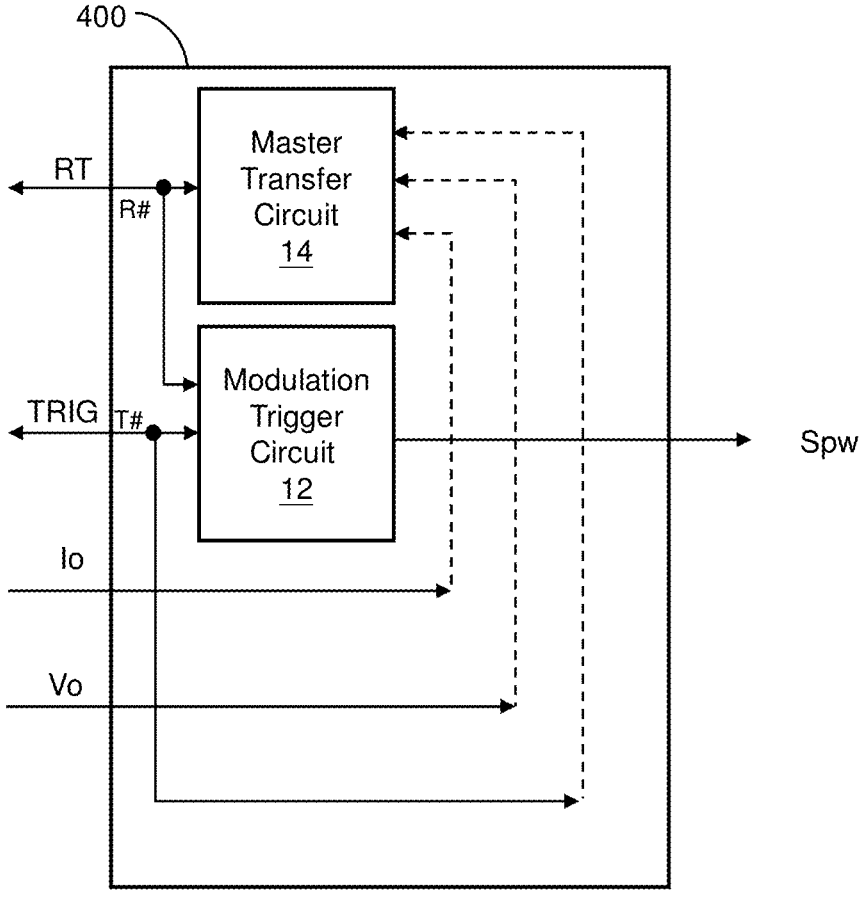
FIG. 3A shows a circuit block diagram of the conversion control circuit according to one embodiment of the present invention.

FIG. 3A shows a circuit block diagram of the conversion control circuit according to one embodiment of the present invention. In this embodiment, the master transfer terminal R # and the modulation trigger terminal T # are separate terminals. As shown in FIG. 3A, the conversion control circuit 400 includes a master transfer circuit 14 and a modulation trigger circuit 12. It should be noted that the conversion control circuit 400 can correspond to one of the conversion control circuits 15, 25, 35, and 45 in FIG. 2A.

When the conversion control circuit 400 is configured as the master circuit, the modulation trigger circuit 12 is configured to generate a modulation trigger signal TRIG through the modulation trigger terminal T #. When the conversion control circuit 400 is configured as a slave circuit, the modulation trigger circuit 12 is configured to receive the modulation trigger signal TRIG through the modulation trigger terminal T #. The modulation trigger circuit 12 generates a pulse-width modulation signal Spw in response to the modulation trigger signal TRIG or its related signals, corresponding to the pulse-width modulation signals Spw0, Spw1, Spw2 . . . SpwN mentioned earlier.

When the conversion control circuit 400 is configured as the master circuit, the master transfer circuit 14 is configured to generate a master transfer trigger signal RT through the master transfer terminal R # based on the output voltage Vo or output current Io of the output power, or based on pulse-width modulation-related signals (e.g., TRIG), to initiate the phase sequence swapping procedure. Conversely, when the conversion control circuit 400 is configured as a slave circuit, the master transfer circuit 14 is configured to receive the master transfer trigger signal RT through the master transfer terminal R # and performs the phase sequence swapping procedure in response to the trigger of the master transfer trigger signal RT.

When the stackable multi-phase power converter 100 experiences a state change or when the accumulated number of state changes exceeds a threshold value or an external command is received, the master transfer circuit 14, of the master circuit, controls the master transfer trigger signal RT turning to the enabled state (e.g., by generating a pulse). The state changes include load state changes, voltage changes, current changes, changes in the number of phases, and/or changes in the frequency of the pulse-width modulation signal. Load state changes include changes from heavy load to light load or from light load to heavy load. Voltage changes include changes in the output voltage or changes in the target output voltage. Current changes include changes in the total current which is a sum of the plural phases of inductor currents. Changes in the number of phases include changes in the number of activated phases. Changes in the frequency of the pulse-width modulation signal include changes from high frequency to low frequency or from low frequency to high frequency.

Figure 3B:
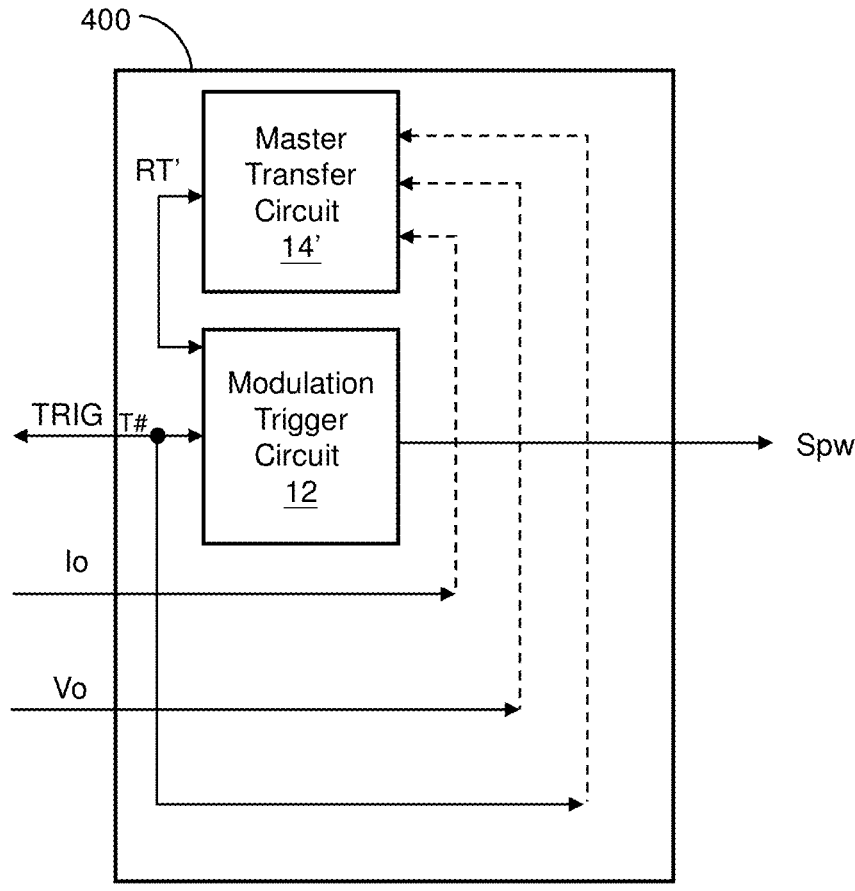
FIG. 3B shows a circuit block diagram of the conversion control circuit according to another embodiment of the present invention.
Figure 3C:
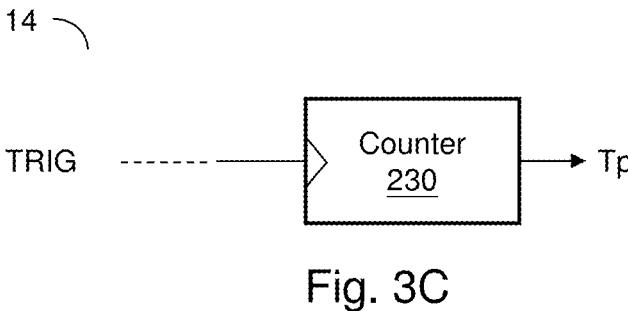
FIG. 3C shows a circuit block diagram of a circuit for generating a predetermined time according to one embodiment of the present invention.
Figure 3D:
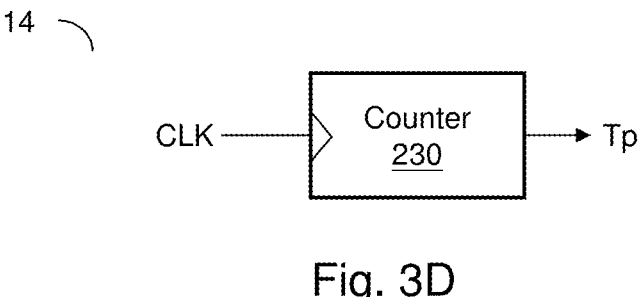
FIG. 3D shows a circuit block diagram of a circuit for generating a predetermined time according to another embodiment of the present invention.
Figure 3E:
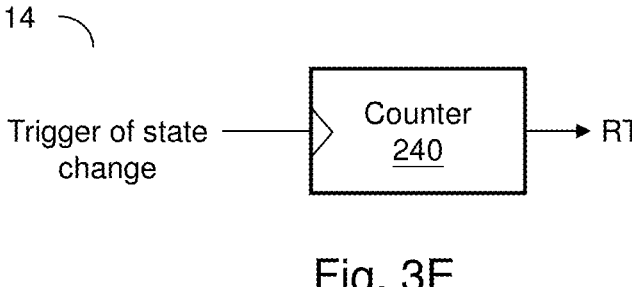
FIG. 3E shows a circuit schematic diagram of a counter for counting state changes according to one embodiment of the present invention.

FIG. 3E shows a circuit schematic diagram of a counter for counting state changes according to one embodiment of the present invention. In one embodiment, the master transfer circuit 14 of the master circuit, accumulates the number of state changes, and when the accumulated number of state changes exceeds a threshold value (e.g., by counting state changes using the counter 240 in FIG. 3E, which is triggered by state changes), a trigger pulse is generated for the master transfer trigger signal RT. In one embodiment, the threshold value can be any integer greater than or equal to 1.

FIG. 3B shows a circuit block diagram of the conversion control circuit according to one embodiment of the present invention. This embodiment is similar to the embodiment in FIG. 3A, with the difference being that in this embodiment, the modulation trigger terminal and the master transfer terminal are combined into a single terminal (i.e., shared modulation trigger terminal T #). Specifically, the modulation trigger signal TRIG generated or received through the modulation trigger terminal T # includes plural different pulses, such as the counting trigger pulse Cnt_pls, the counting reset pulse RST_pls, and the master transfer trigger pulse RT_pls, which will be described in detail later. In this embodiment, the master transfer trigger signal RT' is transmitted between the modulation trigger circuit 12 and the master transfer circuit 14', indicating the trigger of the phase sequence swapping procedure.

FIG. 3C shows a circuit block diagram of a circuit for generating a predetermined time according to one embodiment of the present invention. As shown in FIG. 3C, in one embodiment, the master transfer circuit 14 includes a counter 230 configured to count based on a pulse-width modulation-related signal (e.g., TRIG or its related signals) to determine the predetermined time Tp.

FIG. 3D shows a circuit block diagram of a circuit for generating a predetermined time according to another embodiment of the present invention. As shown in FIG. 3D, in another embodiment, the counter 230 is configured to count based on a fixed-frequency clock (CLK) to determine the predetermined time Tp.

Figure 4:
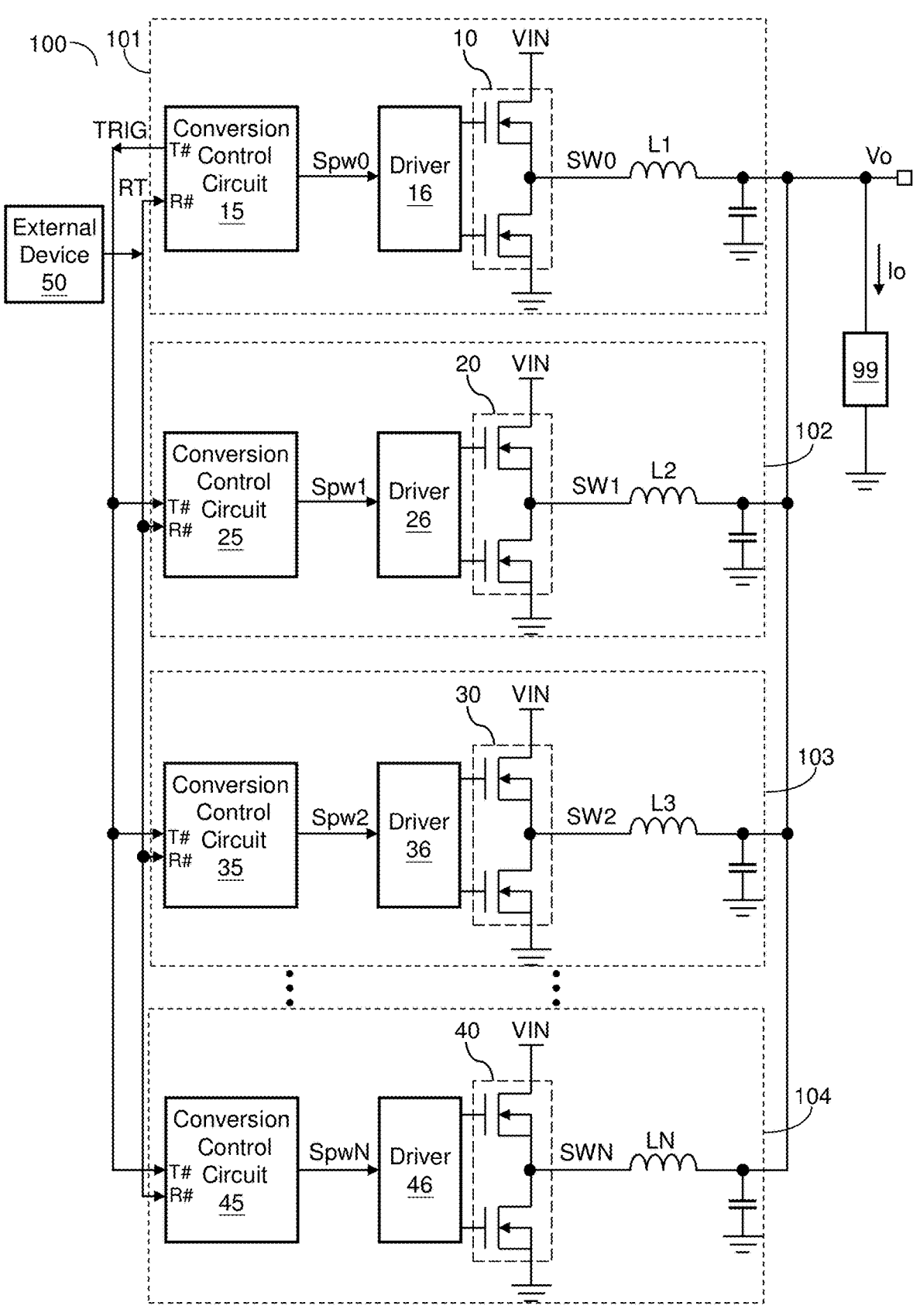
FIG. 4 shows a circuit block diagram of the conversion control circuit according to yet another embodiment of the present invention.

FIG. 4 shows a circuit block diagram of the conversion control circuit according to yet another embodiment of the present invention. This embodiment is similar to the embodiment in FIG. 2A, with the difference being that in this embodiment, the master transfer trigger signal RT is generated by an external device 50.

Figure 5A:
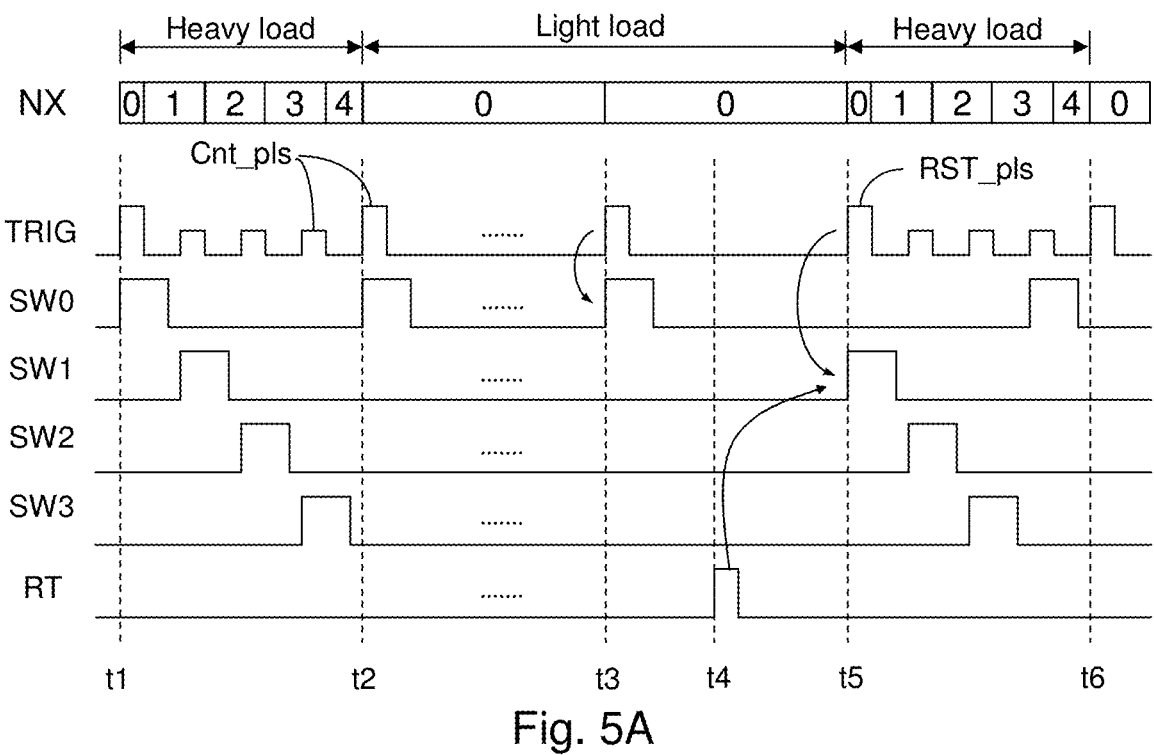
FIGS. 5A-5B show signal waveform diagrams of related signals of the stackable multi-phase power converter and conversion control circuit thereof according to other embodiments of the present invention.

FIG. 5A shows a signal waveform diagram of related signals of the stackable multi-phase power converter and conversion control circuit thereof according to one embodiment of the present invention. The counting number NX, modulation trigger signal TRIG, and switching node voltages SW0, SW1, SW2, and SW3 are shown in FIG. 5A. In this embodiment, a separate master transfer terminal R # is included, such that the master transfer trigger signal RT is a separated signal. As shown in FIG. 5A, the modulation trigger signal TRIG includes plural pulses, such as the counting trigger pulse Cnt_pls and the counting reset pulse RST_pls. The counting trigger pulse Cnt_pls is configured to be accumulatively counted as the counting number NX. Please refer to both FIG. 5A and FIG. 2B. When the counting number NX corresponds to the phase sequence number of the conversion control circuits 15, 25, 35, or 45, the corresponding power stage circuits 10, 20, 30, or 40 are enabled by the conversion control circuits 15, 25, 35, or 45 to generate output power. Note that in this embodiment, the initial phase sequence number of the conversion control circuit 15 is 0, the initial phase sequence number of the conversion control circuit 25 is 1, the initial phase sequence number of the conversion control circuit 35 is 2, and the initial phase sequence number of the conversion control circuit 45 is 3. The aforementioned counting trigger pulse Cnt_pls and the counting reset pulse RST_pls, for example, are different in at least one electrical characteristic, including the voltage level or the width of the pulses of the modulation trigger signal TRIG, as will be described in more detail later.

Please continue to refer to FIG. 5A. In this embodiment, the counting reset pulse RST_pls and the counting trigger pulse Cnt_pls are distinguished by the voltage level of the pulses. As shown in FIG. 5A, the counting reset pulse RST_pls has a higher voltage level, while the counting trigger pulse Cnt_pls has a lower voltage level. The counting reset pulse RST_pls is configured to reset and initiate the counting of the counting number NX. It should be noted that the counting reset pulse RST_pls is also regarded as one counting trigger pulse Cnt_pls.

The phase sequence swapping procedure includes that the master transfer circuit 14 triggers to transfer the master role from the stackable sub-converter originally acting as the master circuit to another stackable sub-converter, among the stackable sub-converters 101, 102, 103, or 104.

Please refer to FIG. 5A, FIG. 3A, and FIG. 2A. At time t1, the stackable sub-converter 101 is configured as the master role, and at time t4, the master transfer trigger signal RT generates a pulse, indicating the phase sequence swapping procedure. Subsequently, at time t5, the master role is transferred to the stackable sub-converter 102. The phase sequence swapping procedure is triggered whenever a pulse is generated by the master transfer trigger signal RT. Please refer to the previous descriptions for the timing and condition of when the master transfer trigger signal RT generates a pulse, indicating the need to initiate the phase sequence swapping procedure.

In one embodiment, the phase sequence swapping procedure further transfers the master role, with a predetermined order, from one stackable sub-converter to another sub-converter. In another embodiment, the phase sequence swapping procedure transfers the master role, per a random order, from one of the stackable sub-converter to another sub-converter.

Figure 5B:
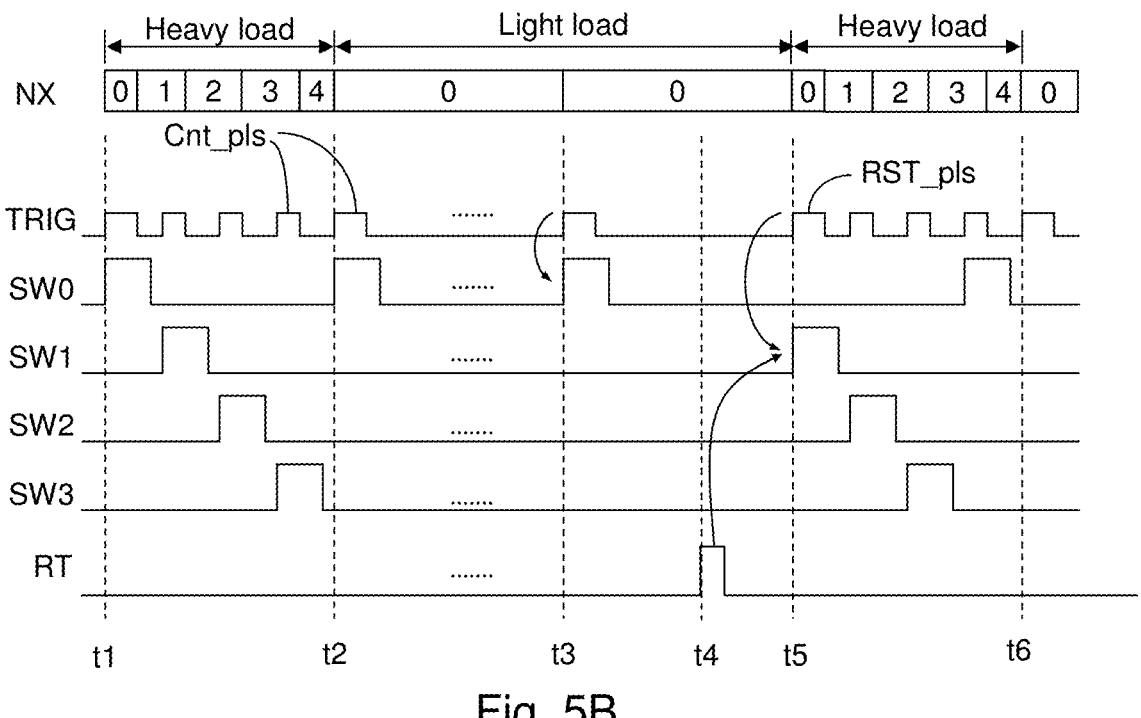

FIG. 5B shows a signal waveform diagram of related signals of the stackable multi-phase power converter and conversion control circuit thereof according to one embodiment of the present invention. In this embodiment, a separate master transfer terminal R # is included, such that the master transfer trigger signal RT is a separated signal. This embodiment is similar to the embodiment in FIG. 5A, with the difference being that in this embodiment, the counting reset pulse RST_pls and the counting trigger pulse Cnt_pls are distinguished by the width of the pulses. As shown in FIG. 5B, the counting reset pulse RST_pls has a wider pulse width, while the counting trigger pulse Cnt_pls has a narrower pulse width.

Figure 6:
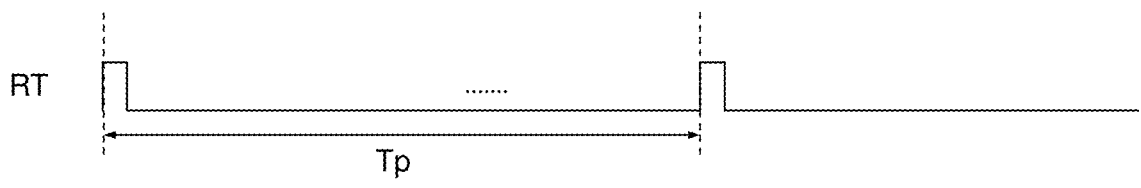
FIGS. 6-7 show signal waveform diagrams of related signals of the stackable multi-phase power converter and conversion control circuit thereof according to embodiments of the present invention.

FIG. 6 shows a signal waveform diagram of related signals of the stackable multi-phase power converter and conversion control circuit thereof according to another embodiment of the present invention. As shown in FIG. 6, the master transfer circuit 14 switches the master transfer trigger signal RT to the enabled state after the predetermined time Tp, generating a pulse, indicating the need to perform the phase sequence swapping procedure.

Figure 7:
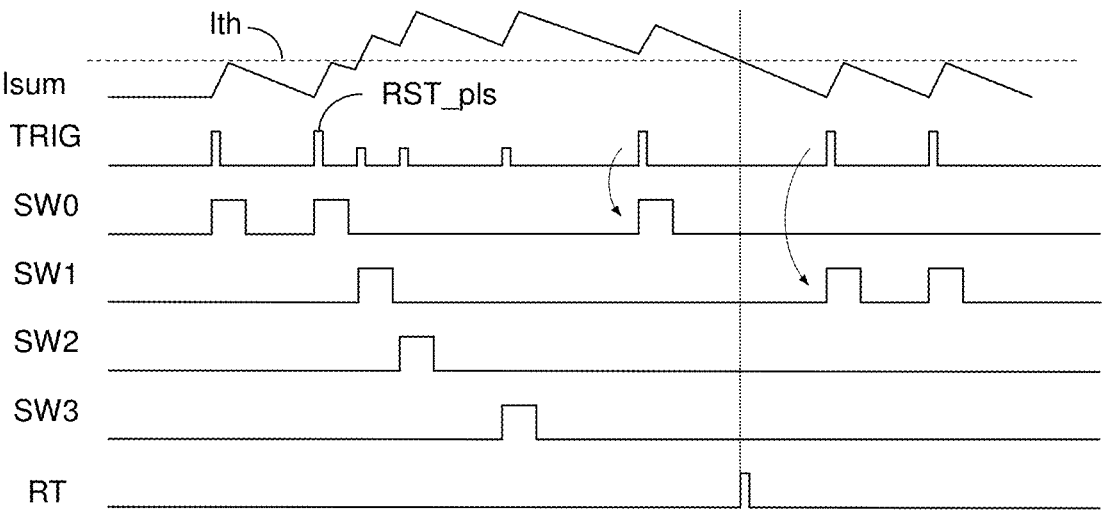

FIG. 7 shows a signal waveform diagram of related signals of the stackable multi-phase power converter and conversion control circuit thereof according to another embodiment of the present invention. As shown in FIG. 7, in one embodiment, the change in total current includes the total current Isum exceeding for example falling below a predetermined threshold Ith. In other words, when the total current Isum drops below the predetermined threshold Ith, the master transfer trigger signal RT is switched to the enabled level. In another embodiment, the change in total current may also include the total current Isum rising above the predetermined threshold Ith.

Figure 8:
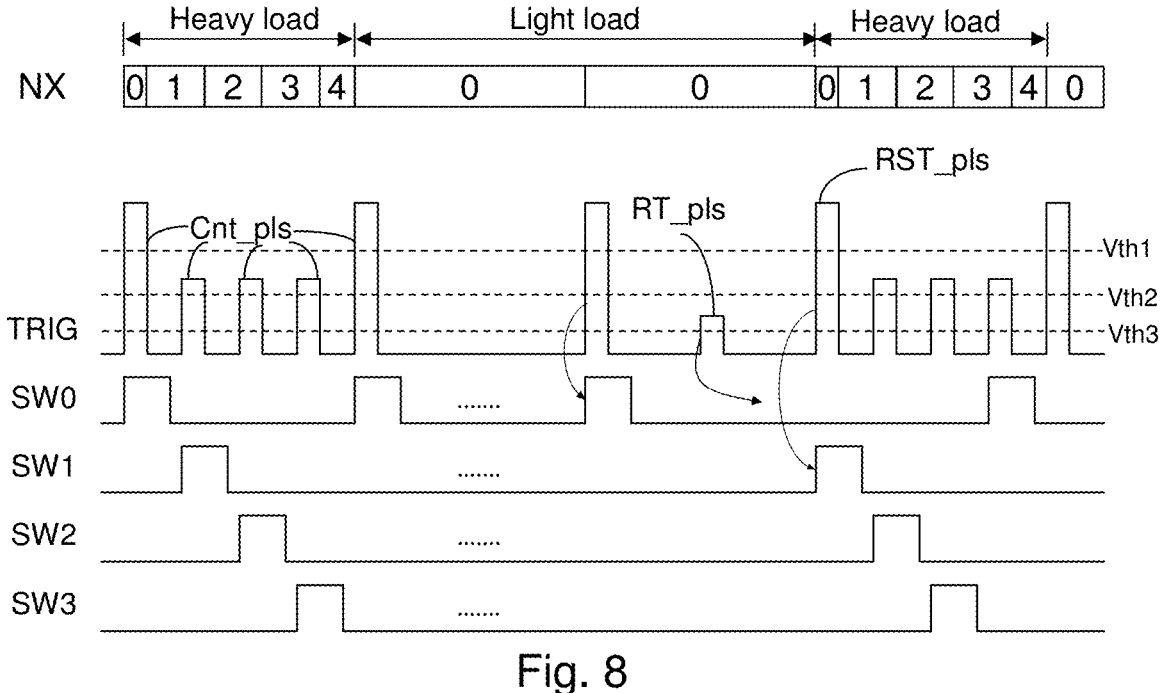
FIGS. 8-10 show signal waveform diagrams of related signals of the stackable multi-phase power converter and conversion control circuit thereof according to embodiments of the present invention.

FIG. 8 shows a signal waveform diagram of related signals of the stackable multi-phase power converter and conversion control circuit thereof according to one embodiment of the present invention. In this embodiment, the modulation trigger terminal T # and the master transfer terminal are combined into a single terminal. In other words, in this embodiment, plural pulses of the modulation trigger signal TRIG generated or received via the modulation trigger terminal T # further include the master transfer trigger pulse RT_pls, which has a voltage level different from those of the counting trigger pulse Cnt_pls and the counting reset pulse RST_pls. The master transfer trigger pulse RT_pls is configured to correspond to the aforementioned master transfer trigger signal RT.

Specifically, as shown in FIG. 8, the master transfer trigger pulse RT_pls, the counting reset pulse RST_pls, and the counting trigger pulse Cnt_pls are generated by the master circuit by overlaying pulses with different levels to generate the modulation trigger signal TRIG shown in FIG. 8, with three different pulse types at different voltage levels.

On the other hand, when the conversion control circuit is configured as a slave circuit, the conversion control circuit can determine the different pulses based on the threshold levels Vth1, Vth2, and Vth3. When the voltage level of the pulse of the modulation trigger signal TRIG is higher than the threshold level Vth1, the conversion control circuit determines the pulse as the counting reset pulse RST_pls. When the voltage level of the pulse of the modulation trigger signal TRIG is between the threshold levels Vth1 and Vth2, the conversion control circuit determines the pulse as the counting trigger pulse Cnt_pls. When the voltage level of the pulse of the modulation trigger signal TRIG is between the threshold levels Vth2 and Vth3, the conversion control circuit determines the pulse as the master transfer trigger pulse RT_pls.

As shown in FIG. 8, the counting trigger pulse Cnt_pls is configured to be accumulatively counted as the counting number NX. The counting reset pulse RST_pls is configured to reset and initiate the counting of the counting number NX. The master transfer trigger pulse RT_pls is utilized as the master transfer trigger signal RT.

Figure 9:
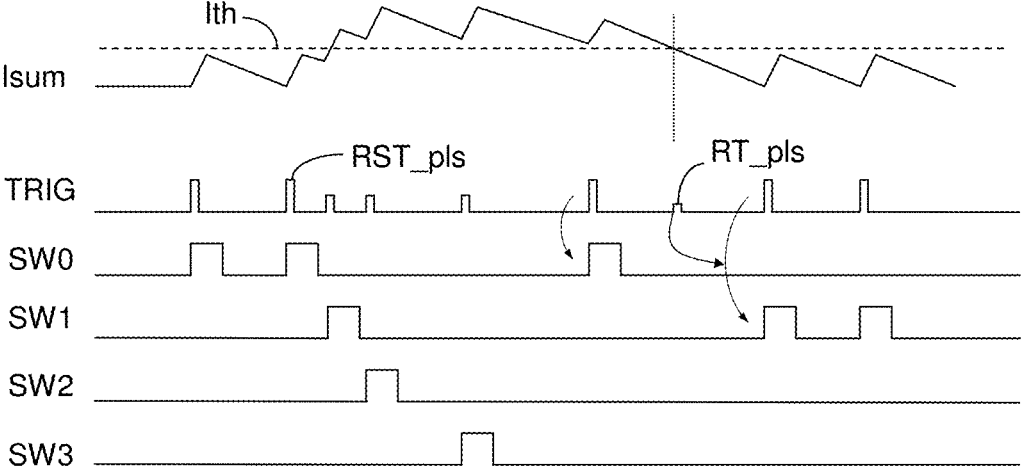

FIG. 9 shows a signal waveform diagram of related signals of the stackable multi-phase power converter and conversion control circuit thereof according to one embodiment of the present invention. This embodiment is similar to the embodiment in FIG. 7, with the difference being that in this embodiment, the modulation trigger terminal T # and the master transfer terminal are combined into a single terminal. Therefore, the modulation trigger signal TRIG further includes the master transfer trigger pulse RT_pls, whose operation is described in FIG. 7.

Figure 10:
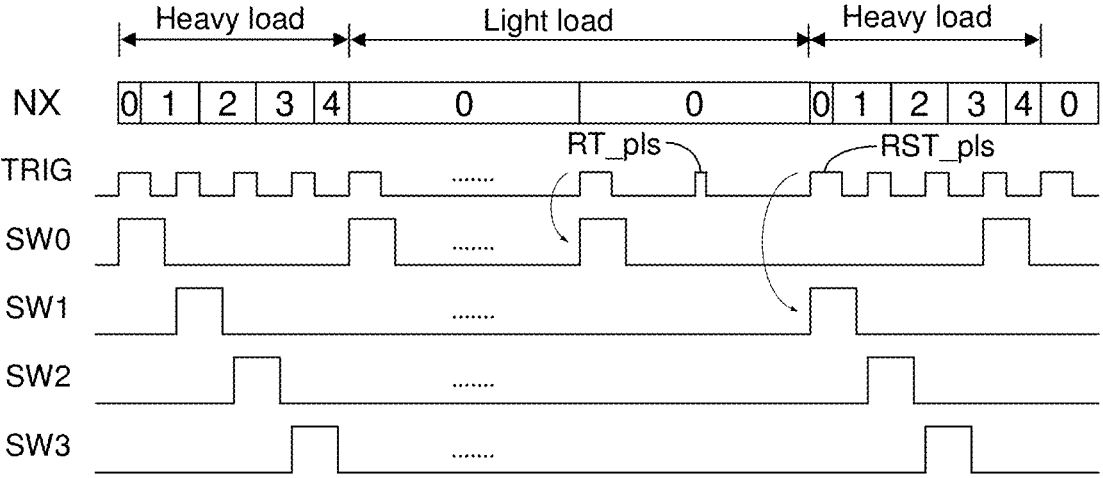

FIG. 10 shows a signal waveform diagram of related signals of the stackable multi-phase power converter and conversion control circuit thereof according to one embodiment of the present invention. This embodiment is similar to the embodiment in FIG. 8, with the difference being that in this embodiment, the modulation trigger signal TRIG distinguishes different pulses by pulse widths.

In summary, by transferring the role of the master circuit, the present invention achieves the effect of balancing switching stress to each sub-converter, mitigating potential phase imbalance and long-term reliability issues.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A conversion control circuit for controlling a stackable multi-phase power converter, wherein the stackable multi-phase power converter includes plural stackable sub-converters, wherein each of the plural stackable sub-converters includes a power stage circuit and a corresponding conversion control circuit, wherein the plural power stage circuits corresponding to the plural stackable sub-converters are coupled in parallel to generate an output power to a load, wherein the conversion control circuit is configured to control at least one switch of a corresponding power stage circuit to switch a corresponding inductor, thereby generating the output power, the conversion control circuit comprising:

a master transfer terminal, wherein a master transfer trigger signal is coupled to a plurality of the master transfer terminals, which are coupled in parallel, of the plural conversion control circuits; and a master transfer circuit configured to generate or receive the master transfer trigger signal through the master transfer terminal, wherein the master transfer trigger signal is generated based on an output voltage or an output current of the output power or a pulse-width modulation related signal;

wherein the conversion control circuit is configured as a master circuit or a slave circuit, wherein when the master transfer trigger signal switches to an enabled state, the conversion control circuit executes a phase sequence swapping procedure, wherein the phase sequence swapping procedure includes: the master transfer circuit triggering a transfer of a master role from the stackable sub-converter originally acting as the master circuit to another stackable sub-converter of the plural stackable sub-converters, and wherein the phase sequence swapping procedure further includes: the master transfer circuit triggering the transfer of a slave phase sequence of the stackable sub-converter originally acting as the slave circuit to another of the stackable sub-converters, other than the one with the master role after the transfer, further comprising:

a modulation trigger terminal, wherein a modulation trigger signal is coupled to plural modulation trigger terminals, which are coupled in parallel, of the plural conversion control circuits;

wherein the modulation trigger signal includes plural pulses during a switching cycle period, wherein the plural pulses include a first pulse, wherein the first pulse, which is triggered periodically based on the switching cycle period, is configured to be accumulatively counted as a counting number, wherein when the counting number corresponds to a phase sequence number of the conversion control circuit, the conversion control circuit enables the corresponding power stage circuit to generate the output power, and wherein the plural pulses further include a third pulse, the third pulse being configured as a counting reset signal to reset and initiate a counting of the counting number.

2. The conversion control circuit of claim 1, wherein when the stackable multi-phase power converter experiences a state change, a predetermined time has passed, a cumulative number of state changes exceeds a threshold value, or an external command is received, the master transfer circuit switches the master transfer trigger signal to the enabled state.

3. The conversion control circuit of claim 2, wherein the state change includes load state changes, voltage changes, current changes, phase count changes, and/or frequency changes of the pulse-width modulation related signal.

4. The conversion control circuit of claim 3, wherein the load state changes include changing from a heavy load state to a light load state or from the light load state to the heavy load state; the voltage changes include a change of the output voltage or a change of a target of the output voltage; the phase count changes include changes in a number of activated phases; the frequency changes of the pulse-width modulation related signal include changing from high frequency to low frequency or from low frequency to high frequency; and/or the current changes include a total current of the output power exceeding a predetermined threshold.

5. The conversion control circuit of claim 2, wherein the state change is detected by the master transfer circuit.

6. The conversion control circuit of claim 2, further comprising a counter configured to accumulate the cumulative number of the state changes.

7. The conversion control circuit of claim 2, wherein the master transfer circuit determines the predetermined time based on counting with a fixed-frequency clock.

8. The conversion control circuit of claim 2, wherein the master transfer circuit determines the predetermined time based on counting the pulse-width modulation related signal, wherein the pulse-width modulation related signal is configured to control the at least one switch of the corresponding power stage circuit.

9. The conversion control circuit of claim 1, wherein the phase sequence swapping procedure is performed in either a random sequence or in a predetermined sequence, transferring the master role of the stackable sub-converter originally acting as the master circuit to another stackable sub-converter.

10. The conversion control circuit of claim 1, wherein the master transfer trigger signal is generated by the master transfer circuit or by an external device.

11. A conversion control circuit for controlling a stackable multi-phase power converter, wherein the stackable multi-phase power converter includes plural stackable sub-converters, wherein each of the plural stackable sub-converters includes a power stage circuit and a corresponding conversion control circuit, wherein the plural power stage circuits corresponding to the plural stackable sub-converters are coupled in parallel to generate an output power to a load, wherein the conversion control circuit is configured to control at least one switch of a corresponding power stage circuit to switch a corresponding inductor, thereby generating the output power, the conversion control circuit comprising:

a master transfer terminal, wherein a master transfer trigger signal is coupled to a plurality of the master transfer terminals, which are coupled in parallel, of the plural conversion control circuits; and a master transfer circuit configured to generate or receive the master transfer trigger signal through the master transfer terminal, wherein the master transfer trigger signal is generated based on an output voltage or an output current of the output power or a pulse-width modulation related signal;

wherein the conversion control circuit is configured as a master circuit or a slave circuit, wherein when the master transfer trigger signal switches to an enabled state, the conversion control circuit executes a phase sequence swapping procedure, wherein the phase sequence swapping procedure includes: the master transfer circuit triggering a transfer of a master role from the stackable sub-converter originally acting as the master circuit to another stackable sub-converter of the plural stackable sub-converters, and wherein the phase sequence swapping procedure further includes: the master transfer circuit triggering the transfer of a slave phase sequence of the stackable sub-converter originally acting as the slave circuit to another of the stackable sub-converters, other than the one with the master role after the transfer, further comprising:

a modulation trigger terminal, wherein a modulation trigger signal is coupled to plural modulation trigger terminals, which are coupled in parallel, of the plural conversion control circuits;

wherein the modulation trigger signal includes plural pulses during a switching cycle period, wherein the plural pulses include a first pulse and plural second pulses with an electrical characteristic different from that of the first pulse, wherein the first pulse, which is triggered periodically based on the switching cycle period, is configured to be accumulatively counted as a counting number, and the second pulse is configured as the master transfer trigger signal, wherein when the counting number corresponds to a phase sequence number of the conversion control circuit, the conversion control circuit enables the corresponding power stage circuit to generate the output power;

wherein the modulation trigger terminal and the master transfer terminal are the same terminal, and wherein the plural pulses further include a third pulse, the third pulse being configured as a counting reset signal to reset and initiate a counting of the counting number.

12. The conversion control circuit of claim 11, wherein the electrical characteristic includes voltage level or pulse width.

13. The conversion control circuit of claim 11, wherein the master transfer trigger signal is generated by the master transfer circuit or by an external device.

14. The conversion control circuit of claim 11, wherein the phase sequence swapping procedure is performed in either a random sequence or in a predetermined sequence, transferring the master role of the stackable sub-converter originally acting as the master circuit to another stackable sub-converter.

15. The conversion control circuit of claim 11, wherein when the stackable multi-phase power converter experiences a state change, a predetermined time has passed, a cumulative number of state changes exceeds a threshold value, or an external command is received, the master transfer circuit switches the master transfer trigger signal to the enabled state.

* * * * *